(12) United States Patent
Fujishima

(10) Patent No.: US 11,921,201 B2
(45) Date of Patent: Mar. 5, 2024

(54) SIGNAL PROCESSING DEVICE, SIGNAL PROCESSING METHOD, AND COMPUTER-READABLE STORAGE MEDIUM

(71) Applicant: MITSUBISHI HEAVY INDUSTRIES, LTD., Tokyo (JP)

(72) Inventor: Yasuo Fujishima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 84 days.

(21) Appl. No.: 17/696,400

(22) Filed: Mar. 16, 2022

(65) Prior Publication Data

US 2022/0299633 A1 Sep. 22, 2022

(30) Foreign Application Priority Data

Mar. 22, 2021 (JP) ................................. 2021-047502

(51) Int. Cl.
*G01S 15/89* (2006.01)

(52) U.S. Cl.
CPC ................................. *G01S 15/8904* (2013.01)

(58) Field of Classification Search
CPC ...... G01S 15/8904; G01S 15/00; G01S 15/89; G01S 15/88
See application file for complete search history.

(56) References Cited

U.S. PATENT DOCUMENTS

| 9,291,711 | B2 * | 3/2016 | Healy, Jr. | G01S 13/904 |
| 9,971,031 | B2 | 5/2018 | Liu et al. | |
| 2006/0222266 | A1 * | 10/2006 | Lauze | G06T 7/269 |
| | | | | 382/299 |
| 2012/0150493 | A1 * | 6/2012 | Casey | H03M 7/3062 |
| | | | | 702/188 |
| 2014/0009326 | A1 * | 1/2014 | Wishart | G01S 13/90 |
| | | | | 342/25 D |
| 2015/0141858 | A1 * | 5/2015 | Razavi | A61B 5/1107 |
| | | | | 600/513 |
| 2016/0061950 | A1 * | 3/2016 | Xu | G01S 15/8997 |
| | | | | 342/25 A |
| 2017/0363725 | A1 * | 12/2017 | Ignjatovic | A61B 8/565 |
| 2020/0064446 | A1 * | 2/2020 | Chan | H04B 17/318 |

FOREIGN PATENT DOCUMENTS

JP 6456312 1/2019

* cited by examiner

*Primary Examiner* — Yuqing Xiao
*Assistant Examiner* — Christopher Richard Walker
(74) *Attorney, Agent, or Firm* — Wenderoth, Lind & Ponack, L.L.P.

(57) ABSTRACT

A signal processing device includes: a data receiver configured to transmit a transmission wave a position of which changes in a first direction and which spreads in a second direction orthogonal to the first direction, and generate a matrix of acquired observation data in the first and second directions, as a reception signal matrix, with a value of a position in the reception signal depending on a signal strength; a range processor configured to specify a range in the second direction in an imaging matrix, and set a sparse vector including a component in the first direction of the specified range; a reconstruction processor configured to perform reconstruction processing using the reception signal matrix and the sparse vector to calculate a component of the sparse vector; and a synthesis processor configured to synthesize the resulting sparse vector while moving the range, to generate an imaging matrix.

8 Claims, 8 Drawing Sheets

SIGNAL PROCESSING DEVICE, SIGNAL PROCESSING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2021-047502 filed in Japan on Mar. 22, 2021.

FIELD

The present disclosure relates to a signal processing device, a signal processing method, and a computer-readable storage medium.

BACKGROUND

An analyzing method for an active sensor that outputs sound waves or radio waves, receives reflected waves of the sound waves or the radio waves, and analyzes a reception signal includes visualizing (imaging) a detection result in some cases. In this case, processing of imaging received information is executed. For example, Japanese Patent No. 6456312 discloses a method of 3D imaging of synthetic aperture radar using compressed sensing.

Processing of compressed sensing is computationally demanding, and when a high-resolution image having a small pixel size is acquired in particular, it may take a long time to acquire an imaging result. Thus, when a detection result is needed in real time, it is required to wait for imaging.

To solve the above-described problem, an object of the present disclosure is to provide a signal processing device, a signal processing method, and a signal processing program that can reduce the amount of computation while resolution is maintained.

SUMMARY OF THE INVENTION

To solve the above-described problem and achieve the object, a signal processing device according to the present disclosure includes: a data receiver configured to transmit a transmission wave a position of which changes in a first direction and which spreads in a second direction orthogonal to the first direction, acquire observation data received, and generate a matrix of the observation data in the first direction and the second direction, as a reception signal matrix, with a value of a position in the reception signal depending on a signal strength; a range processor configured to specify a range in the second direction in an imaging matrix, and set a sparse vector including a component in the first direction of the specified range, the imaging matrix having a number of divisions in the first direction of the reception signal matrix greater than a number of divisions of the reception signal matrix and a same number of divisions in the second direction; a reconstruction processor configured to perform reconstruction processing using the reception signal matrix and the sparse vector to calculate a component of the sparse vector; and a synthesis processor configured to synthesize the sparse vector being a result of the range processing and the reconstruction processing while moving the range, to generate an imaging matrix.

To solve the above-described problem and achieve the object, a signal processing method according to the present disclosure includes: transmitting a transmission wave a position of which changes in a first direction and which spreads in a second direction orthogonal to the first direction; acquiring observation data received; generating a matrix of the observation data in the first direction and the second direction, as a reception signal matrix, with a value of a position in the reception signal matrix depending on a signal strength; specifying a range in the first direction in an imaging matrix; setting a sparse vector including a second component of the specified range, the imaging matrix having a number of divisions in the first direction of the reception signal matrix greater than a number of divisions of the reception signal matrix and a same number of divisions in the second direction; performing reconstruction processing using the reception signal matrix and the sparse vector to calculate a component of the sparse vector; and synthesizing the sparse vector being a result of the range processing and the reconstruction processing while moving the range, to generate an imaging matrix.

To solve the above-described problem and achieve the object, a non-transitory computer-readable storage medium according to the present disclosure stores a signal processing program for causing a computer to execute: transmitting a transmission wave a position of which changes in a first direction and which spreads in a second direction orthogonal to the first direction; acquiring observation data received; generating a matrix of the observation data in the first direction and the second direction, as a reception signal matrix, with a value of a position in the reception signal matrix depending on a signal strength; specifying a range in the first direction in an imaging matrix; setting a sparse vector including a second component of the specified range, the imaging matrix having a number of divisions in the first direction of the reception signal matrix greater than a number of divisions of the reception signal matrix and a same number of divisions in the second direction; performing reconstruction processing using the reception signal matrix and the sparse vector to calculate a component of the sparse vector; and synthesizing the sparse vector being a result of the range processing and the reconstruction processing while moving the range, to generate an imaging matrix.

Advantageous Effects of Invention

According to the present disclosure, the amount of computation can be reduced while resolution is maintained.

DESCRIPTION OF EMBODIMENTS

Preferred embodiments of this invention will be described in detail below with reference to the attached drawings. Note that these embodiments should not be construed to limit this invention and that, when a plurality of embodiments are described, a combination of the embodiments is also included.

Figure 1:
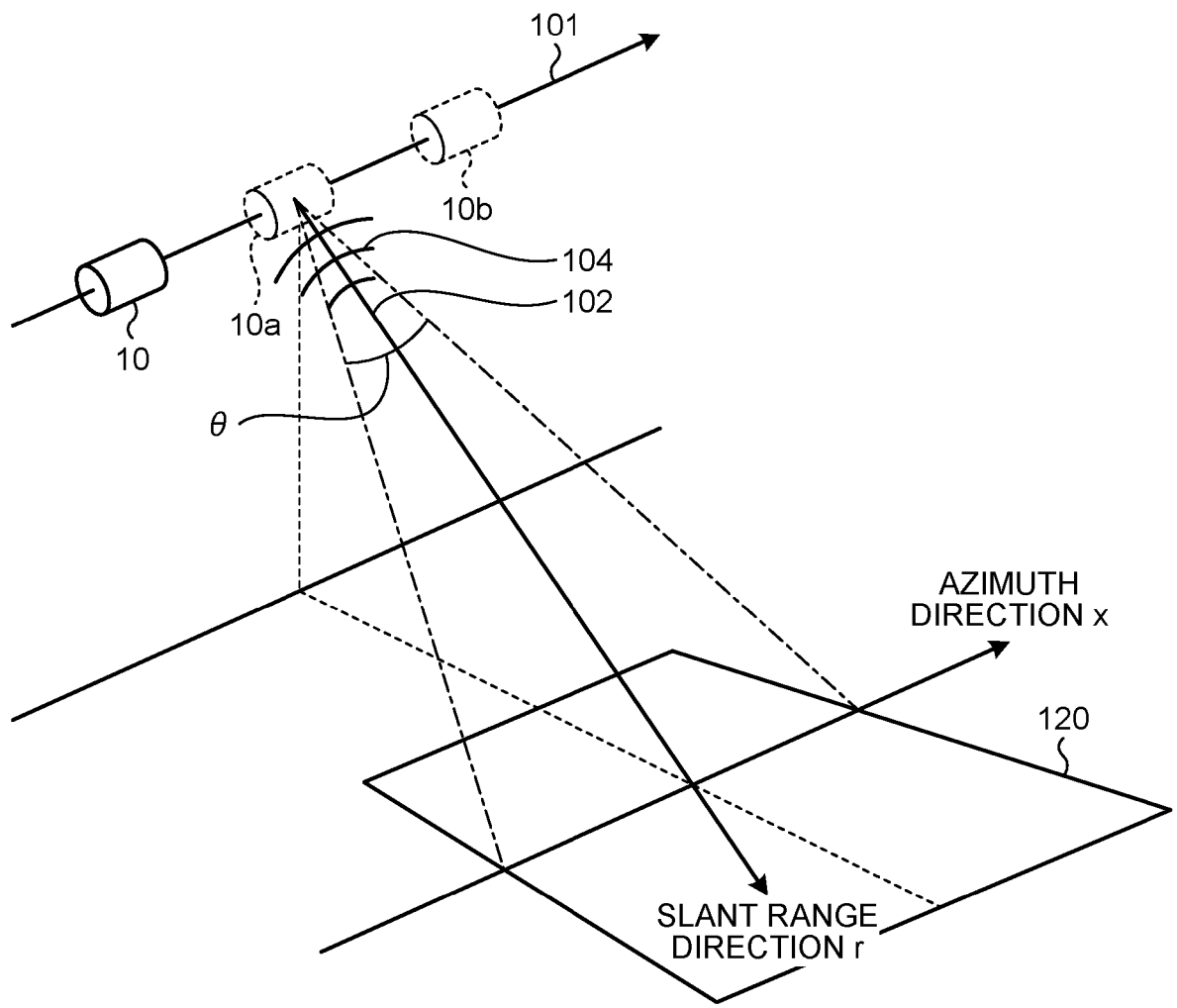
FIG. 1 is a schematic view describing sensing of a measuring instrument according to a first embodiment.

FIG. 1 is a schematic view describing sensing of a measuring instrument according to a first embodiment. FIG. 1 illustrates example sensing of the measuring instrument including a signal processing device of the first embodiment. A measuring instrument 10 performs sensing on the surroundings while moving in an azimuth direction 101. In particular, the measuring instrument 10 moves to a position of measuring instrument 10a and a position of measuring instrument 10b in this order and performs the sensing on the surroundings in each position. In each position, the measuring instrument 10a outputs (emits) a search transmission wave and receives a reception signal 104 being the transmission wave reflected and reaching the measuring instrument 10a. Here, the measuring instrument 10a sets a scope of emission of a transmission wave 102 emitted with a spreading width having an angle θ, as a search scope. In FIG. 1, the measuring instrument 10 performs measurement while moving to the positions of the measuring instrument 10, the measuring instrument 10a, and the measuring instrument 10b, thereby detecting an object where an echo comes in a predetermined region 120 surrounded by the azimuth direction and a slant range direction orthogonal to the azimuth direction. The search region is illustrated as one plane in FIG. 1; however, a three-dimensional region surrounded by a region where the transmission wave reaches is the search scope.

Figure 2:
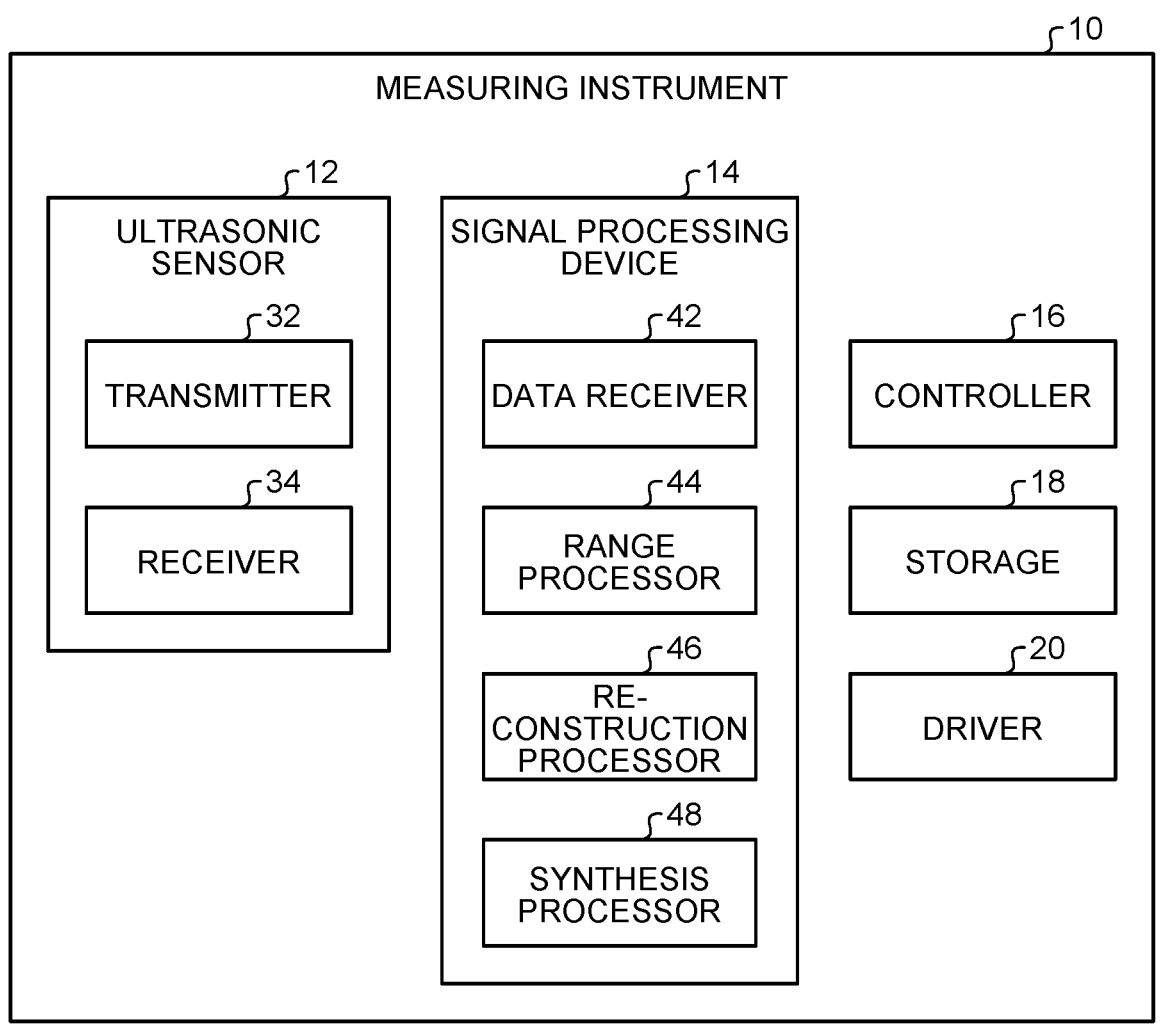
FIG. 2 is a schematic block diagram of the measuring instrument.

FIG. 2 is a schematic block diagram of the measuring instrument. The measuring instrument 10 includes an ultrasonic sensor 12, a signal processing device 14, a controller 16, a storage 18, and a driver 20. The measuring instrument 10 generates examination information on the surroundings with the ultrasonic sensor 12 and the signal processing device 14. The measuring instrument 10 may include a communicator and a display as an outputter outputting an examination result. Furthermore, the measuring instrument 10 detects or calculates its position and has self-position information at each point in time. The measuring instrument 10 supplies the self-position information to the signal processing device 14.

The ultrasonic sensor 12 is an active sensor outputting a sound wave for examination, receiving reflection of the output sound wave, and performing examination, and includes a transmitter 32 and a receiver 34. The transmitter 32 outputs an ultrasonic wave. In the first embodiment, the transmitter 32 outputs a chirp wave. The receiver 34 receives a reflected wave output from the transmitter 32, reflected off an object, and reaching the measuring instrument 10. The receiver 34 also receives a sound wave output from another instrument and other than the reflected wave, as noise.

In the ultrasonic sensor 12, the transmitter 32 and the receiver 34 may be the same unit or may be arranged into an array to perform transmission and reception in each direction. Note that the examination is performed using the ultrasonic wave in the first embodiment; however, a radio wave or the like may be used. When a highly directional inspection wave is used for the sensor, the outputting direction of the inspection wave may be moved, in other words, sweeping may be performed to examine a target region.

The signal processing device 14 processes a signal received by the ultrasonic sensor 12 and performs sensing on the surroundings. The signal processing device 14 includes an arithmetical unit and a memory storing various pieces of information therein. The arithmetical unit is, for example, a central processing unit (CPU). The memory stores therein various pieces of information, such as computation data and a computer program, and includes, for example, at least one of a random-access memory (RAM), a main storage, such as a read-only memory (ROM), and an external storage, such as a hard disk drive (HDD). The signal processing device 14 includes a data transmitter/receiver 42, a range processor 44, a reconstruction processor 46, and a synthesis processor 48.

The data transmitter/receiver 42 acquires information on the reception signal acquired by the ultrasonic sensor 12, performs demodulation, integration, and the like, and, in the first embodiment, generates a reception signal matrix in which measurement results are organized in the azimuth direction and the slant range direction in the scope of a synthetic aperture length $L_A$. The data transmitter/receiver 42 performs demodulation, beam forming, pulse compression, range curvature correction, and the like on the reception signal.

The range processor 44 selects a region to be processed from a matrix of pixels composing an image for imaging generated by processing the reception signal matrix. The matrix of the pixels composing the image for imaging is an observation matrix of which the numbers of pixels in the azimuth direction and the slant range direction are predetermined. Information on each pixel of the observation matrix is processed on the basis of information on the reception signal matrix, whereby the image for imaging is generated. Here, the processed range includes pixels in the same position in the slant range direction.

The reconstruction processor 46 executes processing to calculate a component of the range on the basis of the range selected by the range processor 44 and the observation matrix. The reconstruction processor 46 uses, for example, the alternating direction method of multipliers (ADMM). The reconstruction processor 46 reconstructs data of the range in the observation matrix in which each pixel is smaller than that of the reception signal on the basis of the information on the reception signal and the range in the observation matrix.

The synthesis processor 48 accumulates information on each pixel in the range in the image for imaging acquired by the reconstruction processor 46 and generates an image of the synthetic aperture length.

The controller 16, the storage 18, and the driver 20 are mechanisms controlling movement of the measuring instrument 10. The controller 16 is an arithmetical unit, that is, a CPU. The controller 16 reads a computer program (software) from the storage 18 and executes the computer program to control the movement of the measuring instrument 10. Note that the controller 16 may execute such processing with one CPU or may include a plurality of CPUs that execute the processing. The storage 18 is a memory storing therein various pieces of information, such as computation data of the controller 16 and the computer program, and includes, for example, at least one of a random-access memory (RAM), a main storage, such as a read-only memory (ROM), and an external storage, such as a hard disk drive (HDD). The storage 18 may store therein a processing result detected by the signal processing device 14, that is, a result of the examination. The computer program may be stored, as a signal processing program, on a computer-readable storage medium, such as a magnetic disk, an optical disc, or a semiconductor memory, to be executed by a computer such as the controller 16.

The driver 20 functions as power for the measuring instrument 10 to move. The specific configuration of the driver 20 depends on the operational form of the measuring instrument 10. As an example, when a driving body is a vehicle running on the ground, the driver 20 includes a plurality of wheels and a motor driving some or all of the wheels. When the measuring instrument 10 is a vehicle moving in the air, a propeller and a driving source driving the propeller serve as the driver. When the measuring instrument 10 is a vehicle moving underwater, a screw and a motor driving the screw serve as the driver. The above-described specific configurations of the driver 20 are merely examples, and no such limitation is intended. The driver 20 should function as power enabling the driving body 10 to move.

Figure 3:
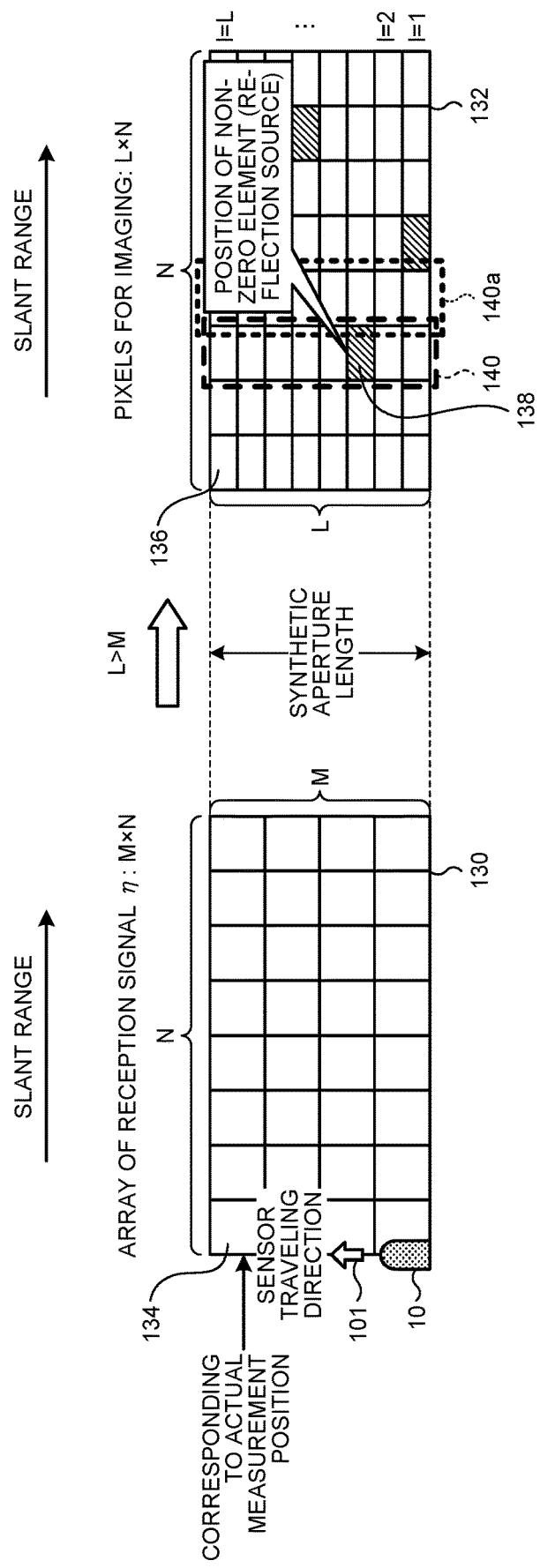
FIG. 3 is an explanatory diagram for explaining example signal processing.
Figure 4:
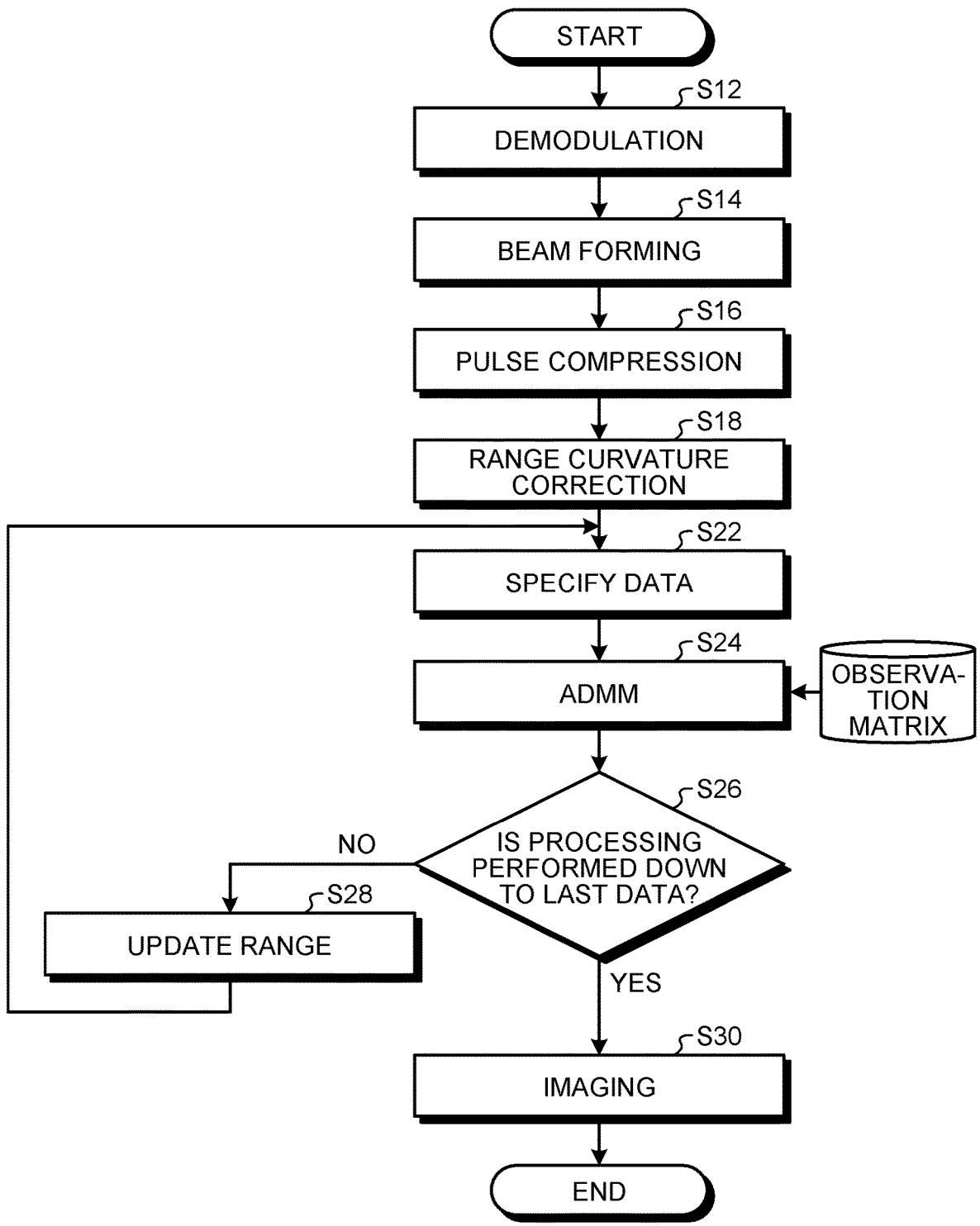
FIG. 4 is a flowchart illustrating an example signal processing method.

Next, examination operation of the measuring instrument 10 and processing operation at the signal processing device 14 will be described with reference to FIGS. 3 and 4. FIG. 3 is an explanatory diagram for explaining example signal processing. FIG. 4 is a flowchart illustrating an example signal processing method. As described above, the signal processing device 14 of the first embodiment divides the image for imaging into ranges (divisions), repeats calculation of pixels in a target range in the image for imaging from the observation matrix for each range, and generates a whole image for imaging, as synthetic aperture processing based on compressed sensing.

The signal processing device 14 performs synthetic aperture processing on a detection result from the ultrasonic sensor 12 being an active sensor. The ultrasonic sensor 12 of the first embodiment transmits a short pulse sound (chirp wave) while traveling in a certain direction and receives its echo $\eta_m(r)$. Here, the reception signal $\eta_m(r)$ indicates a signal after pre-processing, such as demodulation, pulse compression, and range curvature correction, on a complex baseband signal. Note that if the receiver 34 of the ultrasonic sensor 12 is arranged into an array, synthesis into a single signal $\eta_m(r)$ is performed through beam forming. In the first embodiment, the ultrasonic sensor 12 performs measurement M times in a section of the synthetic aperture length $L_A$ and acquires a reception signal vector expressed as $$\eta(r) \in C^{M \times 1} \quad (1)$$

The data receiver 42 performs pulse compression and range curvature correction on the signal acquired from the ultrasonic sensor 12, so that the reception signal vector $\eta(r)$ is expressed as $$\eta(r) = \sum_{l=1}^{L(r)} s_l(r) a(x_l, r) + n(r) \quad (2)$$

(Reference literature: Ouchi, "Principles of Synthetic Aperture Radar for Remote Sensing")

Here, a steering vector $a_m(x_1, r)$ is expressed as $$a_m(x_l, r) = \exp\left(-j\frac{4\pi}{\lambda} d_m(x_l, r)\right), m = 1, 2, \ldots, M, \quad (3)$$

where the steering vector $a_m(x_1, r)$ indicates a phase difference caused in accordance with a difference in the propagated distance $dm(x_1\ r)$ when an echo $s_1(r)$ of a reflection source present in a position $[x_1\ r]$ reaches each measurement position. In the first embodiment, imaging is regarded as a subject in which a known reception signal vector $\eta(r)$ is used to estimate signal strength $s_1(r)$ of the reflection source and its position coordinates $[x_1\ r]$.

The signal processing device 14 sets pixels of an acoustic image as illustrated in FIG. 3 to apply compressed sensing to imaging. Assuming that the reception signal vectors $\eta(r)$ are two-dimensionally arrayed in the whole range r, the size is expressed as M×N. A matrix 130 is the reception signal matrix, the longitudinal direction coincides with the moving direction of the measuring instrument (azimuth or first direction), and the lateral direction coincides with the slant range (second) direction. Each of pixels 134 of the matrix 130 indicates a detection result $\eta m(r)$ in the corresponding position.

Next, let L represent the number of pixels set for fragmenting pixels (division) in the azimuth (e.g., first) direction. With this, the number of pixels in the acoustic image (image for imaging) is expressed as L×N. The vector of a pixel value in the slant range r is expressed as $$s(r) \in C^{L \times 1} \quad (4)$$

If the acoustic image is sparse, the majority of elements of s(r) have a value of 0.

A matrix 132 is a matrix of the image for imaging. The matrix 132 is generated on the basis of information on the observation matrix. A pixel 136 indicates a value in each position in the image for imaging. The matrix 132 is an L×N matrix. Here, L is a numeral greater than M. In addition, L is a numeral greater than N. In the matrix 132, the components of ranges 140 and 140a are vectors of the respective slant ranges. In the range 140, pixels other than a pixel 138 have a value of 0. The pixel 138 has a value other than 0 and is a pixel where a signal is received by the receiver.

Next, to correlate the reception signal vector $\eta(r)$ with the vector s(r) of a pixel in the azimuth direction (the signal strength of the reflection source), the reception signal model is expressed as $$\eta(r) = \sum_{l=1}^{L(r)} s_l(r) a(x_l, r) + n(r) \quad (5)$$

$$= \sum_{l=1}^{L} s_l(r) a(x_l, r) + n(r) = A(r) s(r) + n(r)$$

Here, the observation matrix $$A(r) \in C^{M \times L} \quad (6)$$

and a sparse vector (component contained in a range in the image for imaging)

$$s(r) \in C^{L \times 1} \quad (7)$$

can be respectively defined as $$A(r) \triangleq [\alpha(x_1, r)\alpha(x_2, r) \ldots \alpha(x_L, r)], s(r) \triangleq [s_1(r) s_2(r) \ldots s_L(r)]^T \quad (8)$$

This expression can eliminate the effect of L(r) being an unknown variable and the true value of the number of the reflection sources and can provide simultaneous equations to which compressed sensing can be applied by excluding the observation noise term $\eta(r)$. Here, each row of the observation matrix corresponds to the index $l=1, 2, \ldots L$ of the position in the azimuth direction, and when an azimuthal position where the reflection source is actually present coincides with xi, the element si of the sparse vector has a value other than 0.

Next, the signal strength s(r) of the reflection source in the range r is estimated using the known reception signal η(r) and the observation matrix A(r) on the basis of a generally known reconstruction algorithm of compressed sensing.

Next, example processing of the signal processing device will be described with reference to FIG. 4. The processing illustrated in FIG. 4 indicates a processing flow in which the alternating direction method of multipliers (ADMM) is adopted as the reconstruction algorithm. The signal processing device demodulates, with the data receiver 42, a signal detected by the sensor (step S12). Then, the demodulated signal is subjected to beam forming (step S14), pulse compression (step S16), and range curvature correction (step S18).

Next, the signal processing device 14 specifies data (step S22). Then, the signal processing device 14 acquires information on the observation matrix, executes ADMM processing on the basis of the specified data and the observation matrix, and reconstructs data of the range on the basis of the observation matrix and the data of the range (step S24).

The signal processing device 14 determines whether processing is performed down to the last data (step S26). If determining that the processing is not performed down to the last data (No at step S26), the signal processing device 14 updates the range (step S28), and the procedure goes back to step S22. In other words, similar to processing of changing the range 140 to the range 140a in FIG. 3, a target to be processed is changed in order, and calculation of the pixels of the image for imaging is repeated. If determining that the processing is processed down to the last data (Yes at step S26), the signal processing device 14 performs imaging, that is, generates an image (step S30), and this procedure ends.

Effects

The signal processing device 14 sets a range in the matrix of the image for imaging and performs reconstruction through compressed sensing in range units (divisions), thereby executing the processing faster and more accurately than a case where the whole image is reconstructed at once. In particular, the processing time of the reconstruction algorithm is proportional to the square of the size of the sparse vector. Thus, processing for each range enables faster processing than the case where the whole image for imaging is processed at once. Furthermore, the low dimension of the sparse vector enables highly accurate reconstruction. Furthermore, if L or N has a great value, the matrix A cannot be stored in the memory; however, A(r) is defined in range units, resulting in reduction in required memory.

Second Embodiment

Figure 5:
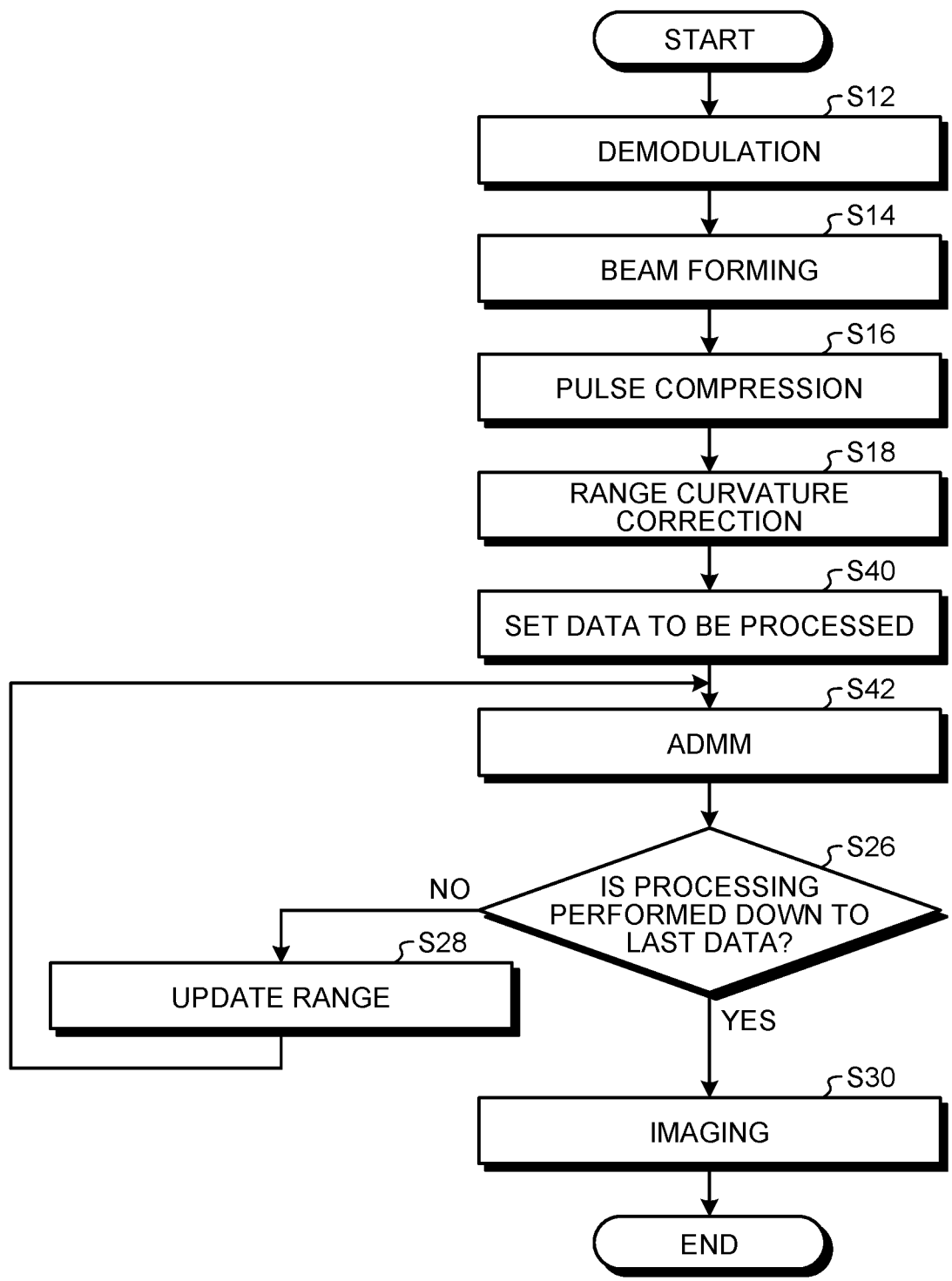
FIG. 5 is a flowchart illustrating an example signal processing method.
Figure 6:
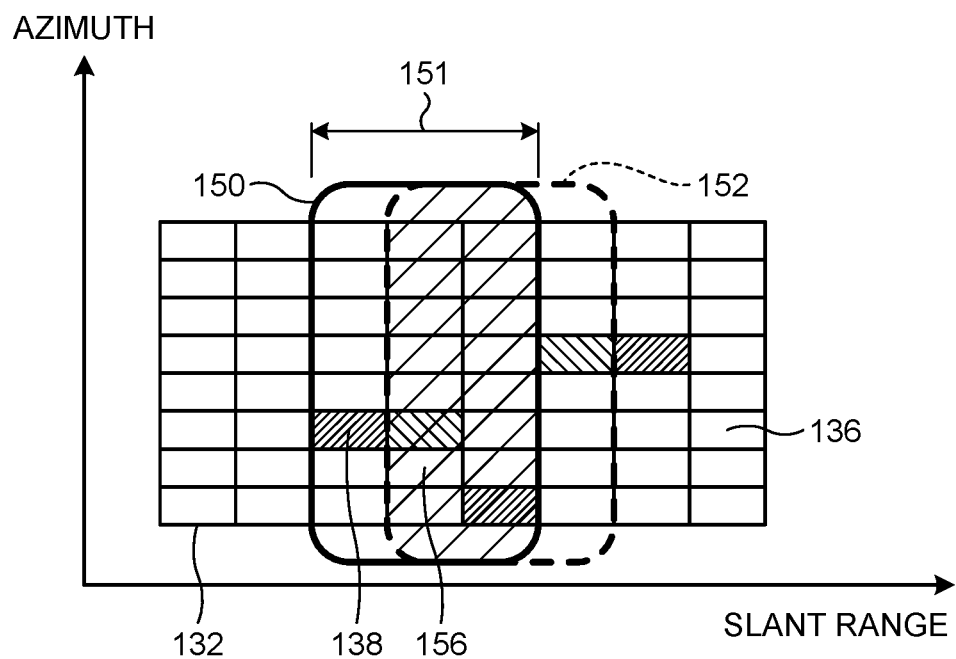
FIG. 6 is an explanatory diagram for explaining example signal processing.

Next, a second embodiment will be described. FIG. 5 is a flowchart illustrating an example signal processing method. FIG. 6 is an explanatory diagram for explaining example signal processing. The first embodiment has proposed the imaging algorithm with the reception signal model defined in range (time) units. However, in theory, the reception signal models are combined over the whole range ($r=\Delta R, 2\Delta R, \ldots N\Delta R$), which enables extension expressed as $$\hat{\eta} = \hat{A}\hat{s} \tag{9}$$

This allows imaging by running the reconstruction algorithm (ADAMM) only once.

The following expression is now given $$\hat{\eta} \triangleq [\eta^T(\Delta R) \quad \eta^T(2\Delta R) \quad \cdots \quad \eta^T(N\Delta R)]^T, \tag{10}$$

$$\hat{A} \triangleq \begin{bmatrix} A(\Delta R) & \eta^T(2\Delta R) & \cdots & 0_{M \times L} \\ 0_{M \times L} & 0_{M \times L} & \cdots & 0_{M \times L} \\ \vdots & \vdots & \ddots & \vdots \\ 0_{M \times L} & 0_{M \times L} & \cdots & A(N\Delta R) \end{bmatrix},$$

$$\hat{s} \triangleq [s^T(\Delta R) \quad s^T(2\Delta R) \quad \cdots \quad s^T(N\Delta R)]^T$$

Using this model eliminates the need for running the ADMM while updating the range as in the first embodiment and requires only input of the reception signal vector n to the ADMM. Unfortunately, a problem arises in that a size of the sparse vector s of NL×1 increases the iteration count of the ADMM. In addition, a size of the observation matrix A of NM×NL causes an increase in the processing time per iterative calculation of the ADMM and the like, and an excessive size of a matrix $A^HA$ may prevent computation.

There is also a problem in that, in imaging with the technique of the first embodiment, the sparse vector is estimated separately for each range, so that correlation between the ranges cannot be taken into consideration. This may cause imaging while a reflection source present over the ranges is divided.

To achieve both appropriate processing time and image reconstruction accuracy, the signal processing device 14 of the second embodiment uses data of the ranges (a plurality of components continuous in the slant range) to perform imaging and moves the processing scope in the range direction while partially overlapping some of the ranges to be processed. From the above, instead of η(r) and A(r), the following expressions are used to perform imaging:

$$\eta(r, P) = [\eta^T(r) \quad \eta^T(r + \Delta R) \quad \cdots \quad \eta^T(r + (P-1)\Delta R)]^T \tag{11}$$

$$A(r, P) = \begin{bmatrix} A(r) & 0_{M \times L} & \cdots & 0_{M \times L} \\ 0_{M \times L} & A(r + \Delta R) & \cdots & 0_{M \times L} \\ \vdots & \vdots & \ddots & \vdots \\ 0_{M \times L} & 0_{M \times L} & \cdots & A(r + (P-1)\Delta R) \end{bmatrix} \tag{12}$$

Here, when $r=\Delta R$ and $P=N$, the above expression (12) is consistent with a case where data of all the ranges is used.

Next, example processing of the signal processing device will be described with reference to FIG. 5. The processing illustrated in FIG. 4 indicates a processing flow in which the alternating direction method of multipliers (ADMM) is adopted as the reconstruction algorithm. The signal processing device demodulates, with the data receiver 42, a signal detected by the sensor (step S12). Then, the demodulated signal is subjected to beam forming (step S14), pulse compression (step S16), and range curvature correction (step S18).

Next, the signal processing device 14 sets data to be processed (step S40). Then, the signal processing device 14 runs the ADMM using the observation matrix and the data to be processed and reconstructs data of a plurality of ranges on the basis of the observation matrix and data of the ranges (step S42).

The signal processing device 14 determines whether processing is performed down to the last data (step S26). If determining that the processing is not performed down to the last data (No at step S26), the signal processing device 14 updates the range (step S28), and the procedure goes back to step S42. If determining that the processing is processed down to the last data (Yes at step S26), the signal processing device 14 performs imaging, that is, generates an image (step S30), and this procedure ends.

The signal processing device 14 performs the above processing to execute reconstruction of a scope 150 through a single reconstruction process as illustrated in FIG. 6. Here, the scope 150 has a width 151 equivalent to a plurality of ranges adjacent to each other in the slant range direction. The signal processing device 14 executes reconstruction processing on a scope 152 obtained by moving the scope by one range in the slant range direction. The signal processing device 14 reconstructs pixels in a region 156 for both the scope 150 and the scope 152.

The signal processing device 14 of the second embodiment can image the ranges at once, so that an acoustic image can be generated while correlation between the ranges is taken into consideration. This enables generation of an image for imaging with higher accuracy.

Let K represent the maximum iteration count of the ADMM (when k reaches K, the ADMM ends). The ADMM has computational complexity $O(KL^2)$ and the range is updated N times, so that the first embodiment has computational complexity $O(NKL^2)$. Imaging of the ranges decreases N but increases computational complexity with the square of L, so that such a range width is set that a computer to be used can perform the processing.

Third Embodiment

Figure 7:
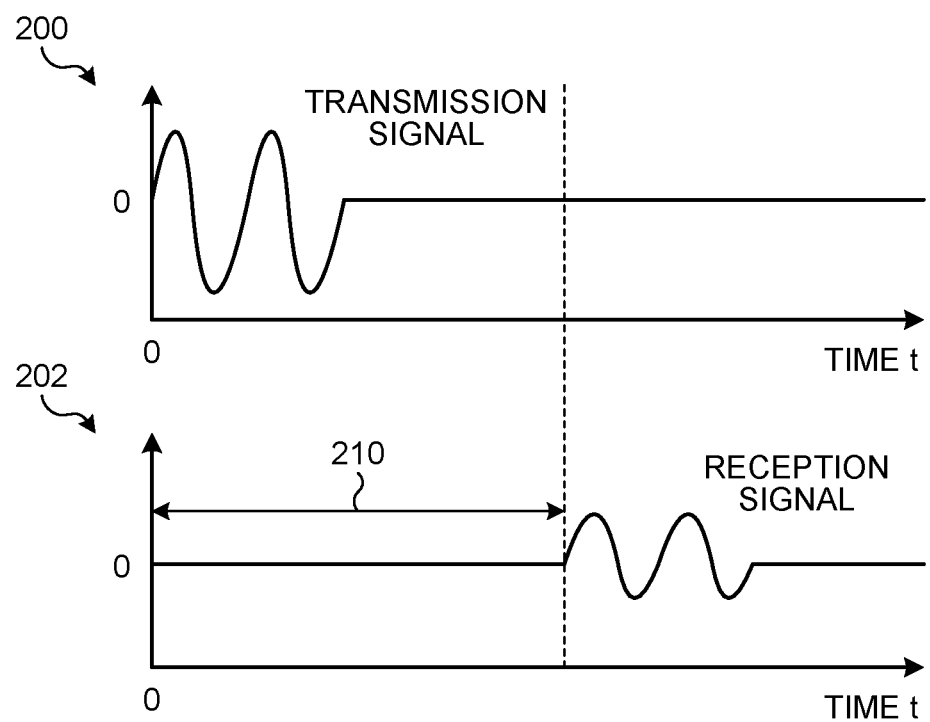
FIG. 7 is an explanatory diagram illustrating example transmission signal and reception signal.
Figure 8:
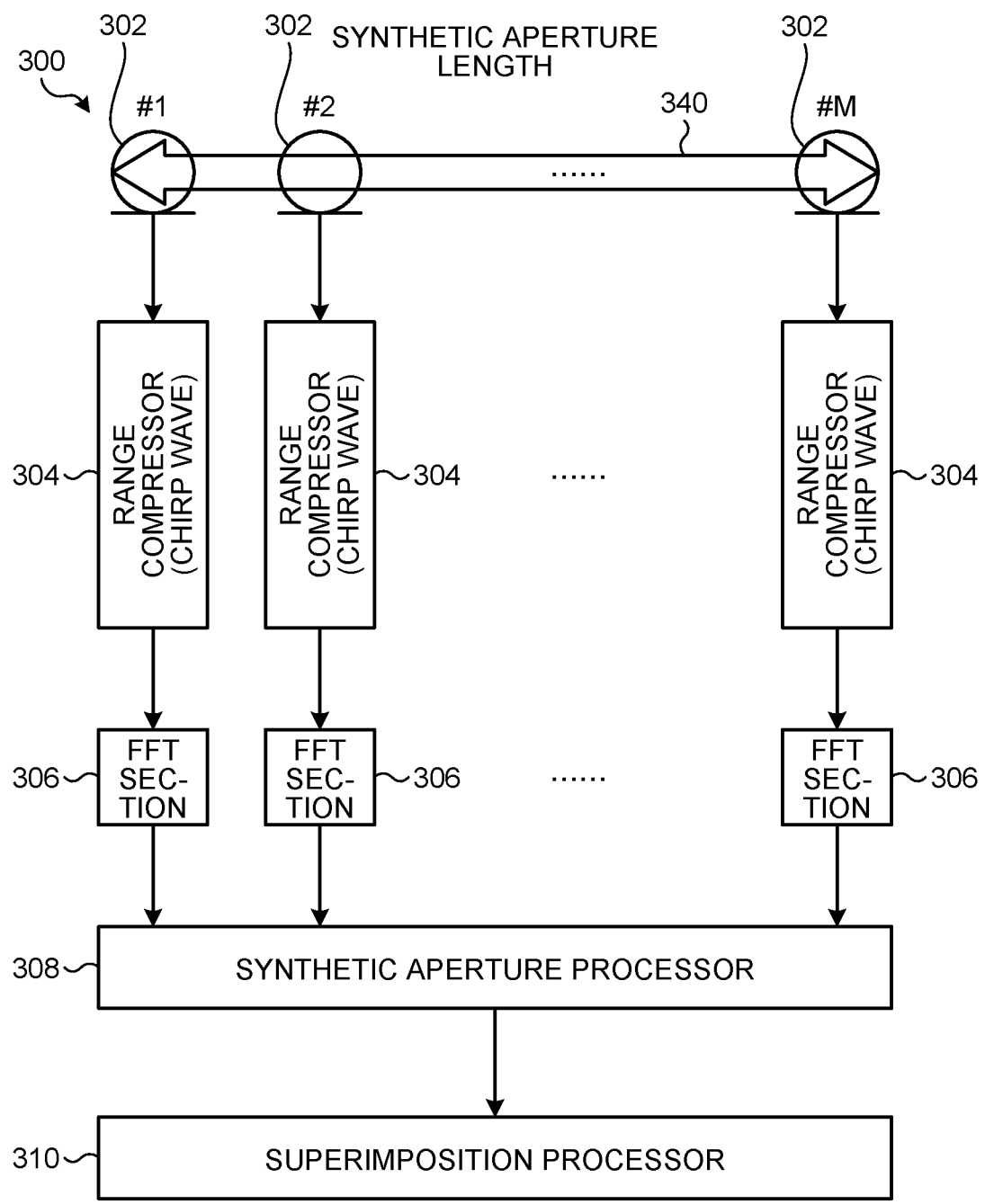
FIG. 8 is an explanatory diagram for explaining example signal processing.

Next, a third embodiment will be described. FIG. 7 is an explanatory diagram illustrating example transmission signal and reception signal. FIG. 8 is an explanatory diagram for explaining example signal processing. The signal processing device 14 is not limited to processing a region divided with respect to time but can also perform processing in the frequency domain. The third embodiment is effective when the reception signal is a real number signal instead of a complex number as in the first and second embodiments, when a broadband signal is transmitted and received, and when a signal other than a chirp wave is transmitted. In specific, a reception signal in the real number domain is subjected to a Fourier transform, and thus a reception signal model similar to those in the first and second embodiments can be acquired.

The ultrasonic sensor 12 is assumed to typically have a reception signal model in which for a transmission signal having a waveform 200 illustrated in FIG. 7, after a lapse of a predetermined time period 210, a reception signal having a waveform 202 is received. Thus, by using continuous time t, the reception signal model is expressed as $$\eta_m(t) = \sum_{l=1}^{L'} \alpha_l s(t) * \delta(t - 2d_{ml}/v) + n_l(t), \quad m = 1, 2, \ldots, M \tag{13}$$

In the expression, s (t) and δ(t) are respectively a signal waveform of the transmission signal and the Dirac delta function, and the operator * is a convolution operator. Furthermore, l and $\alpha_l$ are respectively an index of the reflection source and a signal attenuation factor of the reflection source, and L' is a true value of the number of the reflection sources. At this point, the reception signal waveform ηm(t) has a real number. It is difficult to apply each signal processing technique in the real number domain, and this reception signal model includes the convolution operator. Thus, $n_m(f)$ is expressed, through the Fourier transform in the frequency domain, as $$\eta_m(f) = \sum_{l=1}^{L'} s_l(f) \exp\left(-j4\pi f \frac{d_{ml}}{v}\right) + n_m(f) \tag{14}$$

In this way, it can be seen that the reception signal model $\eta_m(f)$ can be expressed in the complex domain and that the convolution operator can be eliminated. Here, the above expression is summarized as $s_l(f) = \alpha_l s(f)$. It can be seen from comparison with each other that this model and the model in the first embodiment have exactly the same shape except for the difference of the range r and the frequency f. Then, following the first embodiment, the following expressions is given:

$$a_{l,m}(f) \triangleq \exp\left(-j4\pi f \frac{d_{ml}}{v}\right), \tag{15}$$

$$a_l(f) = [a_{l,1}(f) \ a_{l,2}(f) \ \cdots \ a_{l,M}(f)]^T$$

By dividing an imaging scope by pixels of a given size, the reception signal vector in the frequency domain can be expressed as $$\eta(f) = [\eta_1(f) \ \eta_2(f) \ \cdots \ \eta_M(f)]^T \tag{16}$$

$$\eta(f) = \sum_{l=1}^{L} a_l(f)s_l(f) + n(f) = A(f)s(f) + n(f) \tag{17}$$

In the expression, L is the number of pixels determined by the length and width of the imaging scope and the size of the pixels. Then, the ADMM is applied to the above expression to estimate a sparse vector $s(f_n)$ of each frequency bin $f_n$, and these sparse vectors are totaled up to acquire a final imaging result:

$$s_{est} = \sum_{n=1}^{N} s(f_n) \tag{18}$$

The above processing can be executed by a device, such as a signal processing device 300 illustrated in FIG. 8, including sensors 302 acquiring reception signals in the respective positions of a synthetic aperture length 340, range compression processor 304 performing range compression on the data acquired by the respective sensors 302, FFT sections 306 subjecting the range-compressed signals to a Fourier transform, a synthetic aperture section 308 performing synthetic aperture processing on the data acquired by each of the FFT sections 306 for each frequency, and a superimposition processor 310 superimposing results of execution of the synthetic aperture processing. The FFT sections 306 are a fast Fourier transform, and the synthetic aperture processor 308 executes compressed sensing, such as the ADMM. Here, if the transmission signal is not a chirp wave, the reception signals of the sensors can be supplied to the FFT sections with no range compressor 304 provided.

In this way, the signal processing device 14 can perform imaging in the frequency domain and can highly accurately execute sensing with a small workload even when the reception signal has a real number or is broadband.

Fourth Embodiment

Next, a fourth embodiment will be described. The synthetic aperture processing in the first embodiment synthesizes reception signals measured in different positions to build a large virtual sensor, thereby improving the resolution of imaging. Thus, on condition that the sensor has a wide field of view (beam width) and the fields of view in measurement in different positions overlap, the synthetic aperture can provide the effect of improvement in resolution. The fourth embodiment can generate an image for imaging highly accurately even when constraints of processing time and a device configuration or the like require processing for such a long synthetic aperture length that the fields of view of the sensor do not overlap.

The signal processing device 14 of the fourth embodiment reflects an angle of view in an observation matrix to acquire a model corresponding to a physical event, which enables imaging through compressed sensing. For example, the observation matrix of the third embodiment is expressed as $$a_{l,m}(f) \triangleq \psi(X, x, r)\exp\left(-j4\pi f \frac{d_{ml}}{v}\right) \quad (19)$$

This enables reflection of the degree of the angle of view.

In the expression, X is a position of the sensor in the azimuth direction (Note that the position in the range direction is assumed to be 0). The coefficient $\psi(X, x, r)$ indicates an angle of view expressed as $$\psi(X, x, r) = \begin{cases} 1, & \text{if } \operatorname{atan}\left(\frac{r-X}{x}\right) < \beta \\ 0, & \text{if } \operatorname{atan}\left(\frac{r-X}{x}\right) \geq \beta \end{cases} \quad (20)$$

In the expression, β is an angle of view of the sensor. PGP

In this observation model, the coefficient is 1 if the position $[x, r]^T$ of a pixel viewed from the position $[X, 0]^T$ of the sensor is within the field of view of the sensor and 0 if not. It is thus correctly modeled that an echo cannot be received from outside the field of view of the sensor.

In the above description, for the sake of simplicity, the coefficient is set to 1 if the position is within the field of view and 0 if outside the field of view; however, no such limitation is intended. The coefficient may be set to continuous values in which attenuation of sensor sensitivity to the orientation is taken into consideration. In specific, the highest sensitivity is often obtained on the front, so that a model in which the coefficient, set to 1 on the front, decreases as the position moves away from the front can be used.

The signal processing device 14 adds the angle of view of the sensor or the sensitivity to the orientation as a coefficient to the processing function and can thus generate a model based on performance of the sensor, thereby enabling a highly accurate search.

The embodiments of this invention have been described, and contents of these embodiments should not be construed to limit the embodiments. The above-described constituents include constituents that can be easily conceived by those skilled in the art, that are substantially the same, and that are within what is called the scope of equivalents. Furthermore, the above-described constituents can be combined as appropriate. Furthermore, various omissions, substitutions, or modifications of the constituents can be made without departing from the scope of the above-described embodiments.

REFERENCE SIGNS LIST

10, 10a, 10b Measuring instrument
12 Ultrasonic sensor
14 Signal processing device
16 Controller
18 Storage
20 Driver
32 Transmitter
34 Receiver
42 Data receiver
44 Range processor
46 Reconstruction processor
48 Synthesis processor

The invention claimed is:

1. A signal processing device comprising:
a data transmitter/receiver configured to:
    transmit a transmission wave a position of which changes in a first direction and which spreads in a second direction orthogonal to the first direction,
    acquire observation data received, and
    generate a matrix of the observation data in the first direction and the second direction, as a reception signal matrix, with a value of a position in the reception signal depending on a signal strength;
a range processor configured to:
    specify a range in the second direction in an imaging matrix, and
    set a sparse vector including a component in the first direction of the specified range, the imaging matrix having a number of divisions in the first direction of the imaging matrix greater than a number of divisions in the first direction of the reception signal matrix, and the imaging matrix having a same number of divisions in the second direction as the reception signal matrix;
a reconstruction processor configured to perform reconstruction processing using the reception signal matrix and the sparse vector to calculate a component of the sparse vector; and
a synthesis processor configured to synthesize the sparse vector being a result of the range processing and the reconstruction processing while moving the range, to generate the imaging matrix.

2. The signal processing device according to claim 1, wherein the sparse vector has one component in the second direction.

3. The signal processing device according to claim 1, wherein:
    the sparse vector has a plurality of components in the second direction, and
    the range processor is configured to set a range moved by a number smaller than a number of the components of the sparse vector in the second direction.

4. The signal processing device according to claim 1, wherein the first direction coincides with a moving direction of a sensor.

5. The signal processing device according to claim 4, wherein the transmission wave is a chirp wave.

6. The signal processing device according to claim 1, wherein the data transmitter/receiver is configured to:
    correct the observation data in accordance with an angle of view of a sensor, and
    set the reception signal matrix with a reduced effect of a component outside an angle of view.

7. A signal processing method comprising:
    transmitting a transmission wave a position of which changes in a first direction and which spreads in a second direction orthogonal to the first direction;
    acquiring observation data received;

generating a matrix of the observation data in the first direction and the second direction, as a reception signal matrix, with a value of a position in the reception signal matrix depending on a signal strength;

specifying a range in the first direction in an imaging matrix;

setting a sparse vector including a second component of the specified range, the imaging matrix having a number of divisions in the first direction of the imaging matrix greater than a number of divisions in the first direction of the reception signal matrix, and the imaging matrix having a same number of divisions in the second direction as the reception signal matrix;

performing reconstruction processing using the reception signal matrix and the sparse vector to calculate a component of the sparse vector; and synthesizing the sparse vector being a result of the range processing and the reconstruction processing while moving the range, to generate the imaging matrix.

8. A non-transitory computer-readable storage medium storing a signal processing program for causing a computer to execute:

transmitting a transmission wave a position of which changes in a first direction and which spreads in a second direction orthogonal to the first direction;

acquiring observation data received;

generating a matrix of the observation data in the first direction and the second direction, as a reception signal matrix, with a value of a position in the reception signal matrix depending on a signal strength;

specifying a range in the first direction in an imaging matrix;

setting a sparse vector including a second component of the specified range, the imaging matrix having a number of divisions in the first direction of the imaging matrix greater than a number of divisions in the first direction of the reception signal matrix, and the imaging matrix having a same number of divisions in the second direction as the reception signal matrix;

performing reconstruction processing using the reception signal matrix and the sparse vector to calculate a component of the sparse vector; and synthesizing the sparse vector being a result of the range processing and the reconstruction processing while moving the range, to generate the imaging matrix.

* * * * *